United States Patent [19]

Iwamoto et al.

[11] Patent Number: 4,544,233

[45] Date of Patent: Oct. 1, 1985

[54] UNDERWATER OPTICAL FIBER CONNECTOR

[75] Inventors: Yoshinao Iwamoto; Yuichi Shirasaki; Masayuki Fujise; Kenichi Asakawa, all of Tokyo, Japan

[73] Assignee: Kokusai Denshin Denwa Co., Ltd., Tokyo, Japan

[21] Appl. No.: 445,518

[22] Filed: Nov. 30, 1982

[30] Foreign Application Priority Data

Dec. 5, 1981 [JP] Japan .................. 56-195972

[51] Int. Cl.⁴ .............................................. G02B 7/26
[52] U.S. Cl. .................... 350/96.20; 174/705
[58] Field of Search ........... 350/96.20, 96.21, 96.22; 174/705

[56] References Cited

U.S. PATENT DOCUMENTS 4,253,729  3/1981  Rocton ........................ 350/96.20
4,295,707  10/1981  Nakai et al. ................. 350/96.20

FOREIGN PATENT DOCUMENTS 55-28037  2/1980  Japan .................. 350/96.20
56-62214  5/1981  Japan .................. 350/96.20
57-93303  6/1982  Japan .................. 350/96.20

*Primary Examiner*—John Lee

[57] ABSTRACT

A connector for connecting together in a water-tight housing various optical instruments of an underwater or submarine arrangement having optical fiber cables. The connector is constructed in a manner such that a plug containing the terminals of optical fiber cables is connected in an easily attachable/detachable fashion to a receptacle which is mounted on the water-tight housing. Sealing material is interposed between the water-tight housing and the receptacle and between the receptacle and the plug for preventing the infiltration of water or sea water into the water-tight housing.

6 Claims, 6 Drawing Figures

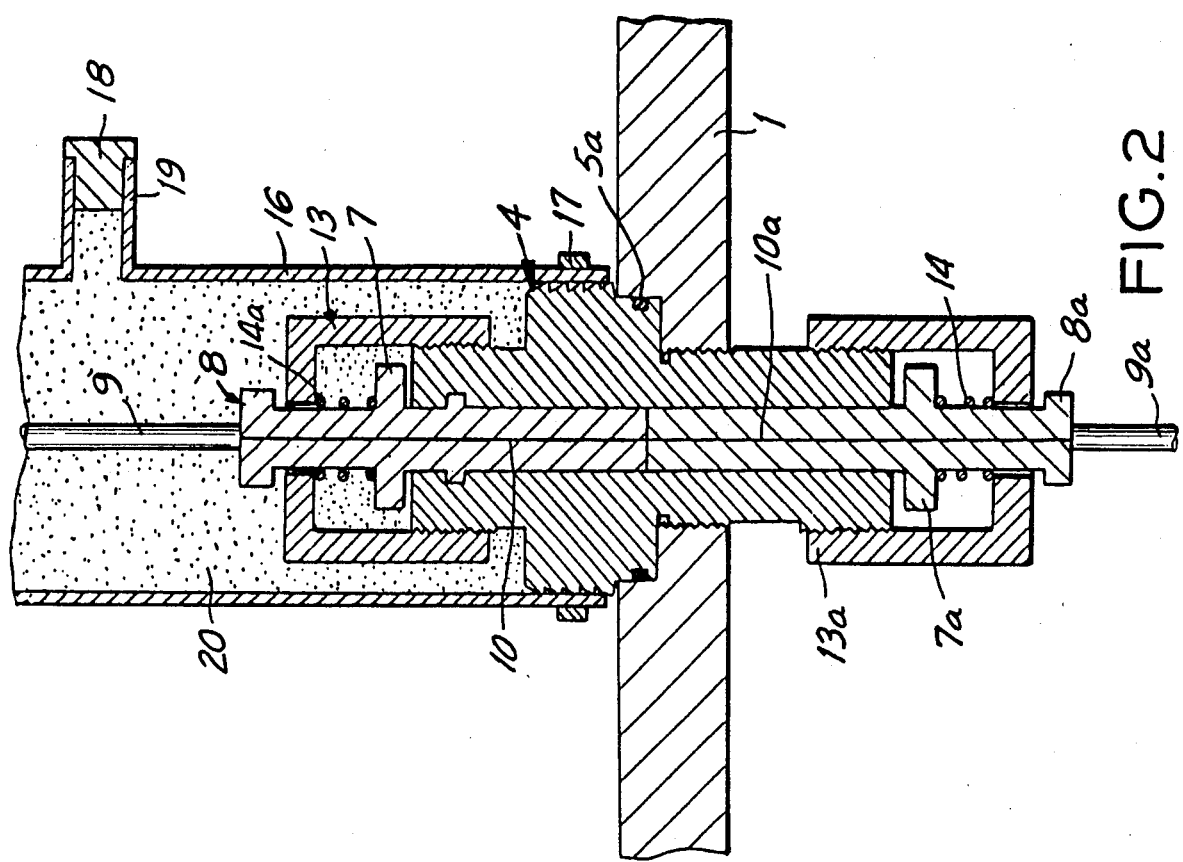
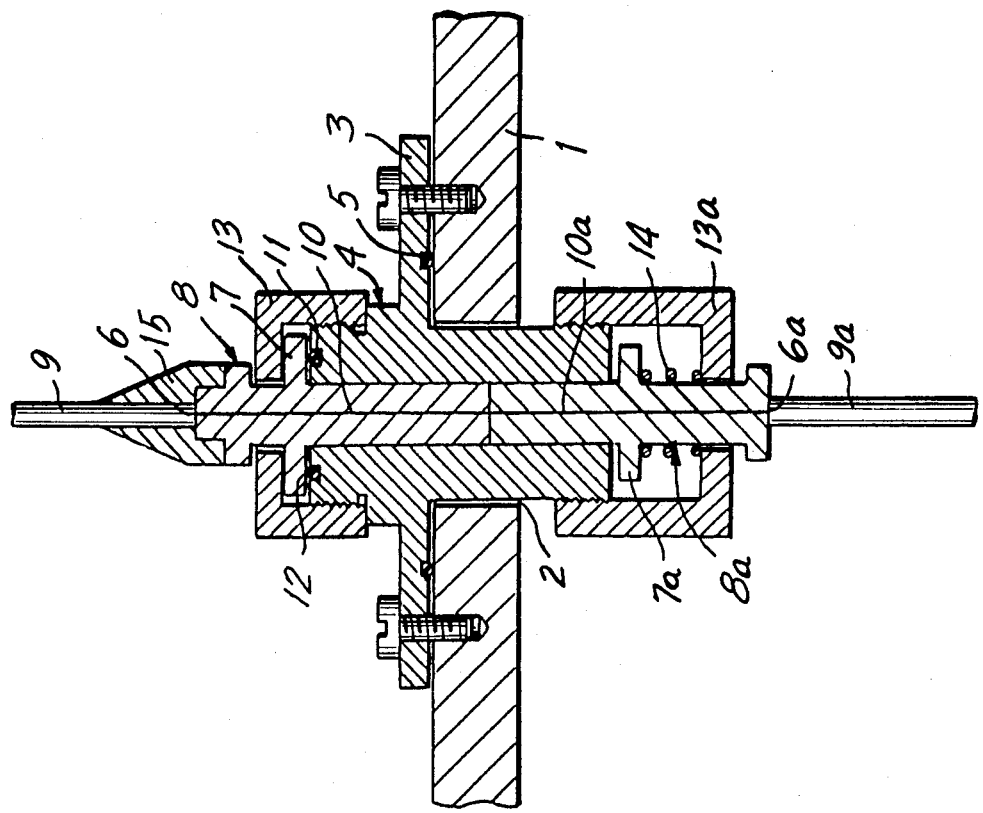

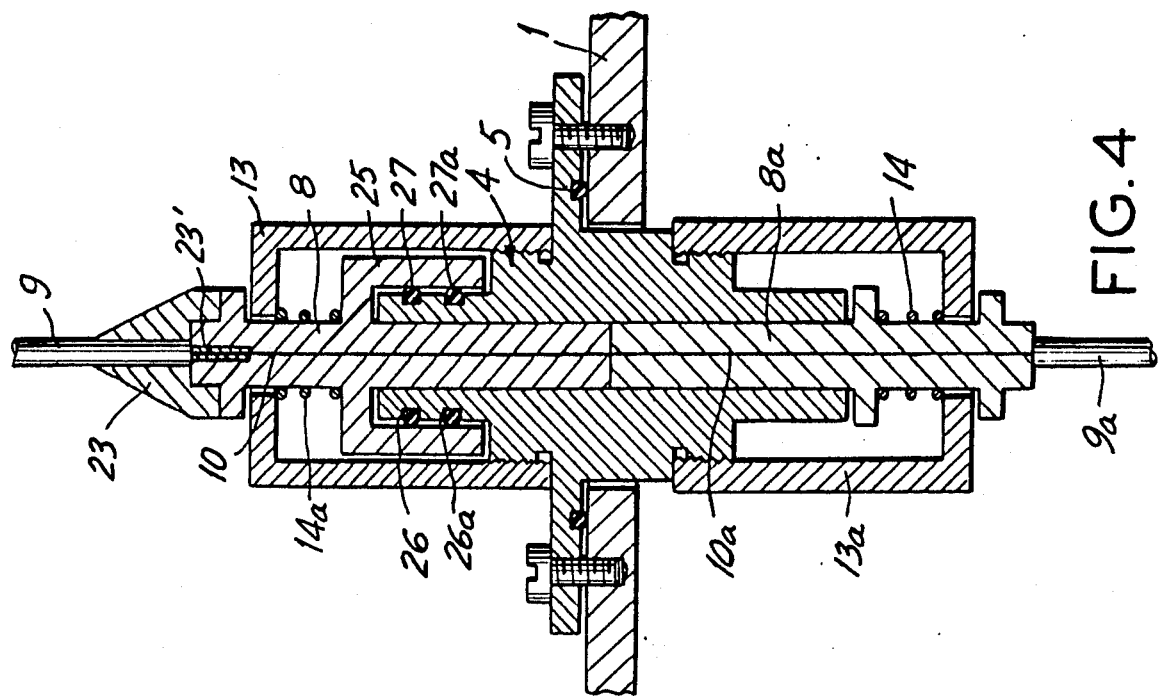
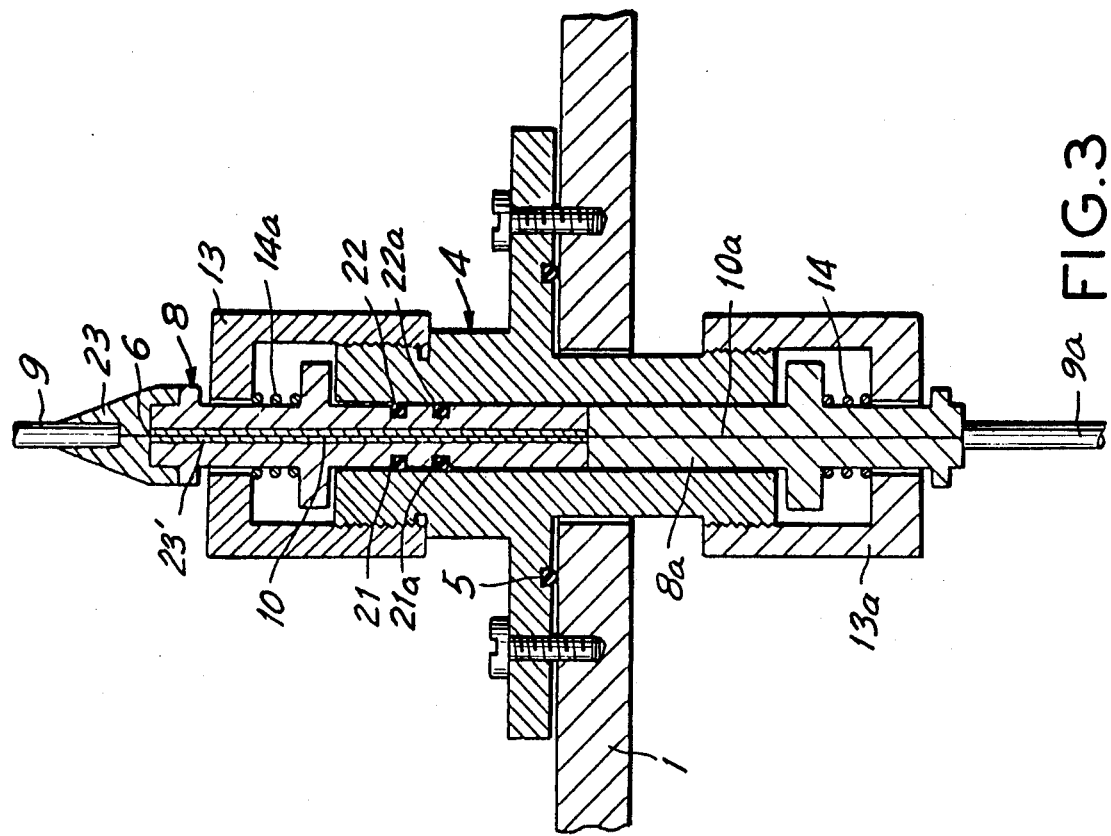

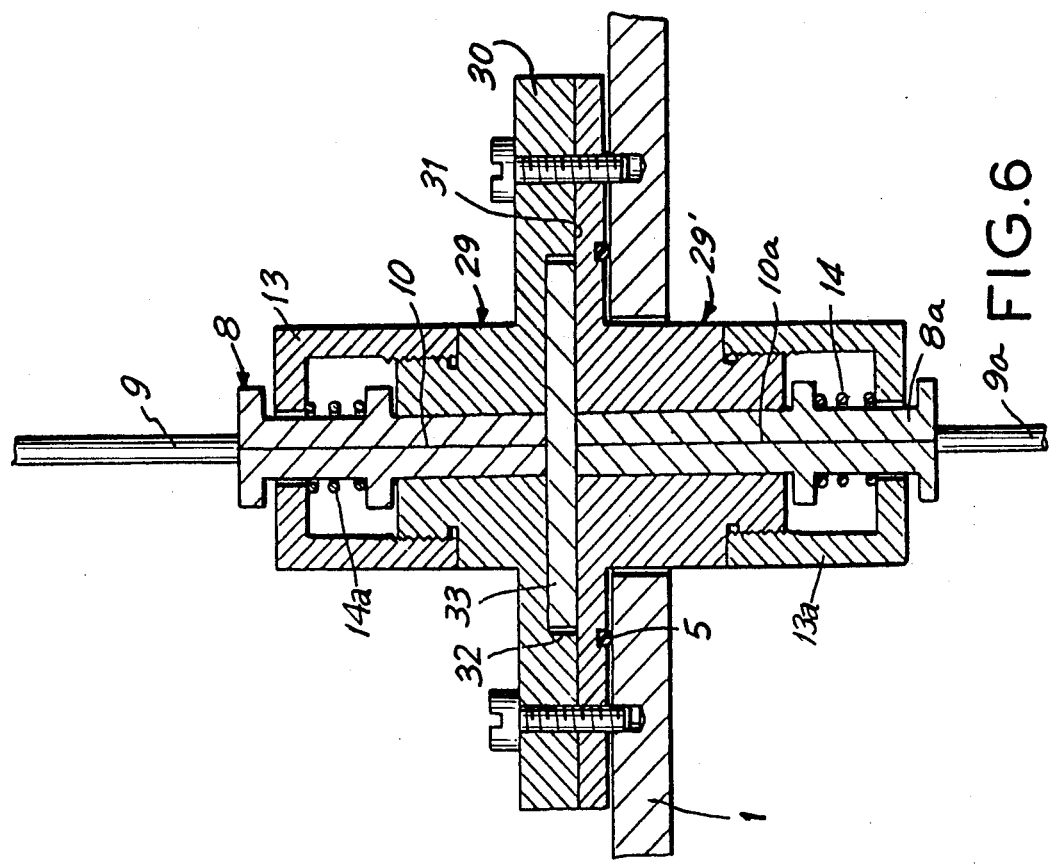
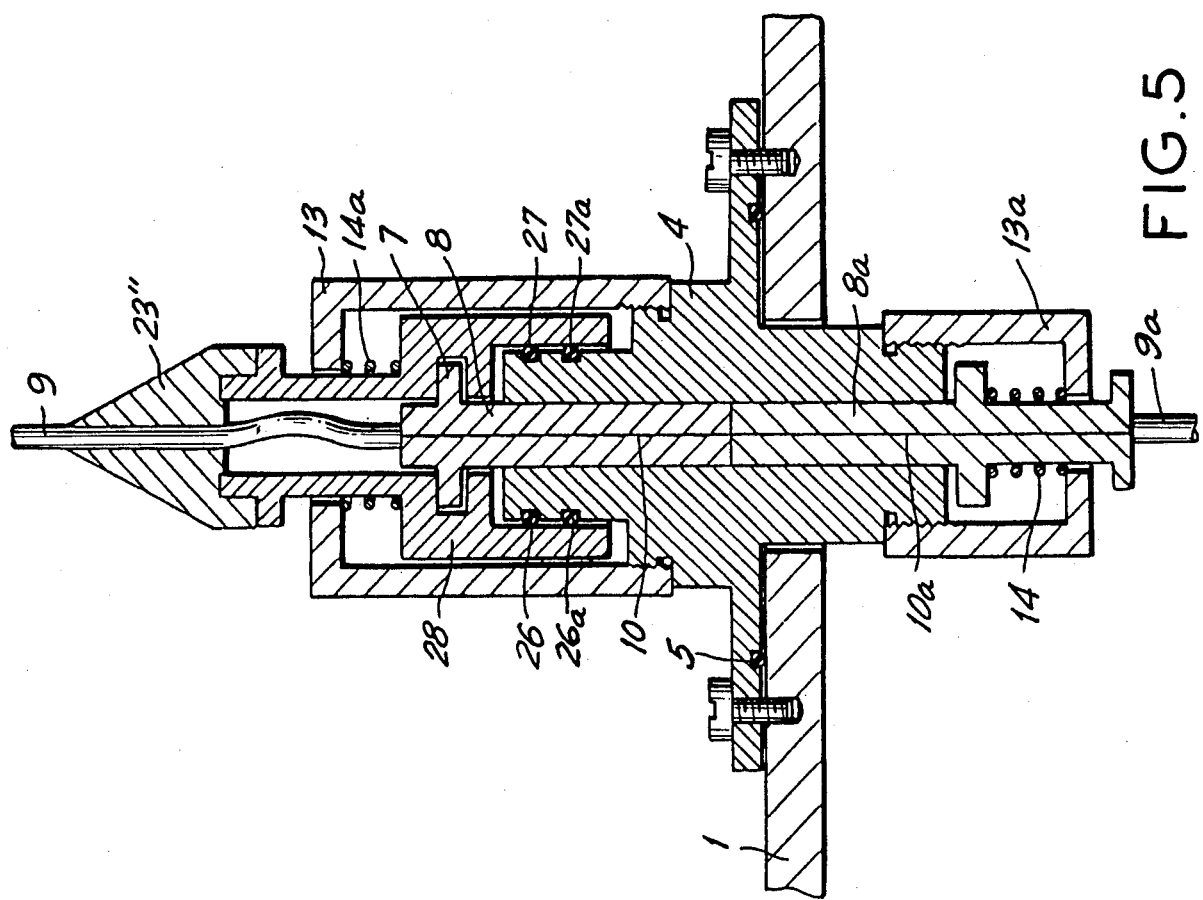

UNDERWATER OPTICAL FIBER CONNECTOR

FIELD OF THE INVENTION

The present invention relates to an underwater connector for use in optical fibers and particularly suitable for use in underwater optical cables.

BACKGROUND OF THE INVENTION

Optical fibers have been put into practice in various fields because of such advantageous properties as to transmit signals at a lower loss, not to be electrically interfered with and to be formed at a lighter weight and with a small diameter.

Oceanic development has actively been promoted in recent years in exploring natural resources, fishery, construction of submarine cables and pipe lines or in maintenance thereof. Optical fibers have proved to be applicable in such fields. An example of such application is the use of optical fibers as a signal line in a composite control cable connecting a mother ship to a submersible, taking advantage of the composite control cable's power transmission function, signal transmission function and high tensile strength. The composite control cables are naturally required to be light in weight and small in diameter and moreover, transmitted signals should be free from interference from power lines. Optical fibers satisfy such requirements.

When optical fibers are used underwater, the connector connecting the optical fibers to submerged machines or tools is required to have a water-tight construction. In the prior art, ordinary connectors for optical fibers for use on land were covered entirely with a water-tight, pressure-resistant shell and used as water-tight optical fiber connectors underwater but difficulties arose in handling as the size of the connectors grew larger.

SUMMARY OF THE INVENTION

The present invention aims at obviating such problems heretofore encountered and at providing a connector of water-tight construction for use in optical fibers which is compact in size and simple in handling. And the structure of the present invention in accordance with that object is an underwater optical fiber connector comprising a receptacle which is inserted in a water-tight housing to be fixed integrally therewith, an annular sealing member which is interposed between the said receptacle and the said water-tight container, a internal plug which is fixedly engaged with the said receptacle from the inside of the said water-tight housing and which is connected to the ends of optical fiber cables in the said water-tight housing so as to have the center line of the optical fibers penetrate at the center thereof, an outer plug which is engaged with the said receptacle in a manner to allow easy attachment/detachment from the outside of the said water-tight container to oppose the said internal plug and which is connected to the ends of optical fiber cables outside of the said water-tight housing to have the center line of the optical fibers penetrate at the center thereof, a cylindrical holding fixture which is screwed from the outside of the said water-tight housing into the said receptacle and which pushes the said outer plug into the said receptacle for fixation so as to make the opposing end surfaces of the said internal plug and the said outer plug abut each other, and a sealing member which is interposed between the said receptacle and the said outer plug.

Therefore, the present invention provides a water-tight optical fiber connector which is more compact in size and easier to handle compared with prior art products and which has a higher reliability in water-tightness by fixedly engaging two plugs with optical fiber cables connected thereto with a receptacle engaged in a water-tight housing of underwater machines in a water-tight manner, and by sealing a small gap between the plug on the side of the water and the receptacle. Since the connector is not of the type which is covered entirely with a pressure-resistant housing, the attachment/detachment of the optical fiber cable becomes extremely simple.

BRIEF DESCRIPTION OF THE DRAWINGS

FIGS. 1–6 are sectional views showing embodiments of the water-tight optical fiber connector according to the present invention.

DETAILED DESCRIPTION OF PREFERRED EMBODIMENTS

The present invention will now be described referring to embodiments shown in the attached drawings. The first embodiment of the connector according to the present invention will now be explained with reference to the sectional view shown in FIG. 1. A receptacle 4 having a flange portion 3 on the outer periphery thereof is fit and engaged from the water side of a water-tight housing 1 (from the upper side in the figure) into an aperture 2 bored in the water-tight housing 1 of a submarine machine of water-tight construction which has been thrown into the water. The flange portion 3 of the receptacle 4 and the water-tight housing are fixed to each other by bolts with an O-ring 5 (a sealing member) therebetween, in a water-tight manner. A pair of plugs 8, 8a having through holes 6, 6a at the center thereof and flanges 7, 7a on the periphery thereof are snugly engaged with the receptacle 4 in a manner to allow easy attachment/detachment respectively from the water side and from the inside of the water-tight housing 1 (from the lower side in the figure), and in coaxial abutment. The plugs 8, 8a further have inside and outside optical fiber cables 9, 9a connected therewith with an adhesive agent (not shown). Bare optical fibers 10, 10a protruding from peeled tip ends of the optical fiber cables 9, 9a are fixedly inserted through the through holes 6, 6a in a manner to come to the same level as the end faces of the plugs 8, 8a which are in abutment. An O-ring (a sealing member) 12 which is placed in a groove 11 annularly provided on the upper end surface of the receptacle 4 is interposed between the flange 7 of the plug 8 on the water side and the upper suface of the receptacle 4 which abuts the flange 7. The flange 7 is pressed in a water-tight manner against the receptacle 4 with a holding fixture 13 of a cylindrical form which is screwed with a screw provided on the outer periphery of the upper end of the receptacle 4. The plug 8a on the inside of the water-tight housing 1 is pressed against the plug 8 by compressed coil springs 14 which are interposed between a cylindrical holding fixture 13a screwed in a screw cut on the outer periphery of the lower part of the receptacle 4 and the flange 7a. The connecting portion of the optical fiber cable 9 and the plug 8 outside of the housing 1 is sealed on the outer surface thereof with a sealing material 15 of, for instance, a water tight adhesive agent in order to impart water-tight property to the through hole 6. Water, therefore, would not enter the inside of the water-tight housing 1 even if the connector is subjected to a high hydraulic pressure in the water since the O-rings 5, 12 and the sealing material 15 keep the housing water-tight. The plug 8 can easily be taken out in the atmosphere simply by detaching the holding fixture 13.

The second embodiment will now be explained referring to the sectional view shown in FIG. 2. The explanation on the parts identical with those of the first embodiment will be omitted and only those different therefrom will be described hereinafter. A compressed coil spring 14a is interposed also between the flange 7 of the plug 8 and the holding fixture 13, and the plug 8 and the plug 8a therefore are pressed against each other by spring force. The receptacle 4 is connected to the water-tight housing 1 with an O-ring 5a therebetween, by screws. A cylindrical tube 16 surrounding the optical fiber cable 9 is engaged with the outer periphery of the receptacle 4 and is tightened with an annular band 17 in a water-tight manner. An inlet/outlet port 19 is defined on the tube 16 to protrude toward the outside, the port having a detachable stop 18 therein. The inside of the tube is filled with sealing oil 20 which is poured from the said inlet/outlet port 19. Since the inside of the tube 16 does not contact water, the second embodiment does not require the O-ring 12 and the sealing material 15 of the first embodiment. Even if the sealing oil 20 is subjected to a high pressure underwater, if the clearance between the plug 8 and the receptacle 4 is made as tight as possible, the sealing oil 20 should not infiltrate thereinto. But even if oil seepage occurs, if the oil is of a lesser degree of light absorption, the influence such oil might impart on the coupling efficiency should be negligible. The seepage of the oil into the water-tight housing 1, if any, would not corrode parts therein.

The third embodiment will now be described referring to the sectional view shown in FIG. 3. O-rings (sealing members) 22, 22a are engaged respectively in two annular grooves 21, 21a which are provided on the outer periphery of the plug 8, thereby keeping the clearance between the plug 8 and the receptacle 4 water-tight. The optical fiber cable 9 is fixed to the plug 8 via an adhesive agent 23 of water-tight property while the bare optical fiber 10 is fixedly inserted in the plug 8 in a water-tight manner via a water-tight adhesive agent 23'. This helps to prevent the infiltration of water into the gap between the outer sheath of the optical fiber cable 9 and the bare optical fiber 10 or the gap between the bare optical fiber 10 and the plug 8 when the optical fiber cable 9 is broken. Any materials may be used for the connector. In the case where the plug 8 is metal, the water-tight connection of the bare optical fiber 10 with the plug 8 can be achieved, instead of by the water-tight adhesive agent 23', by a cover around the bare optical fiber 10 of vapor-deposited metal and soldering the vapor-deposited metal on the plug 8. The water-tight adhesive agent 23' interposed between the bare optical fiber 10 and the plug 8 does not have to extend fully along the length of the plug 8 but may extend only in the upper part, leaving the bare optical fiber in the lower part for insertion.

The fourth embodiment will be described hereinafter with the reference made to the sectional view shown in FIG. 4. In the figure, the plug 8 is provided with a flange 25 of a cylindrical form which is engageable with the receptacle 4. The flange 25 is engaged with the receptacle 4 in a water-tight manner via O-rings (sealing members) 27, 27a which are engaged in the two annular grooves 26, 26a bored in the outer periphery of the receptacle 4. The bare optical fiber 10 inserted in the plug 8 is fixed in a water-tight manner to the plug 8 only in the upper part thereof via a water-tight adhesive agent 23'. There is no possibility, therefore, that the grease used for the O-rings 27, 27a would seep into the gap between the plug 8 and the receptacle 4 to adhere to the bare optical fibers 10, 10a through the abutted end faces of the plugs 8, 8a. Even if the optical fiber cable 9 is severed for some reason, the water can be prevented from entering therein by the adhesive agent of water-tight property 23'.

The fifth embodiment will be explained hereinafter referring to the sectional view shown in FIG. 5. A cylindrical connecting member 28 buts against the flange 7 of the plug 8 and is engaged with the receptacle 4 in a water-tight manner via O-rings 27, 27a which are engaged in two annular grooves 26, 26a bored in the outer periphery of the receptacle 4. The plug 8 is pressed downward by a compressed coil spring interposed between the holding fixture 13 and the connecting member 28. The optical fiber cable 9 connected to the plug 8 is made to slightly sag in the upper portion of the connecting member 28 which protrudes from the holding fixture 13 and is then fixed with a water-tight adhesive agent of resilient property 23''. Even if the optical fiber cable 9 is subjected to external force when the plug 8 is being engaged with the receptacle 4, such force would be resiliently absorbed by the water-tight adhesive agent 23'' without imparting lateral force on the plug 8, thereby achieving smooth engagement with the receptacle 4.

The sixth embodiment will now be described referring to the sectional view shown in FIG. 6. The sixth embodiment omits the tube 16 out of the embodiment shown in FIG. 2 and constructs the receptacle 4 as described below; two receptacles of a flange form 29, 29' are abutted against each other coaxially and a cylindrical concave portion 32 is provided protrudingly from the abutment surface of a flange 30. A transparent plate 33 of a corresponding cylindrical form is placed in portion 32. The receptacles 29, 29' and the transparent plate 33 are integrally fixed with a water-tight adhesive agent (not shown). Two plugs 8, 8a with optical fiber cables 9, 9a connected thereto are engaged in a manner to oppose each other via the transparent plate 33. Water may enter close to the interface between the plug 8 and the transparent plate 33 but will not effect the bare optical fiber 10 if the water does not contain harmful substances. Further, the amount of the water which might infiltrate is too small to influence the coupling efficiency of the fibers 10, 10a. As the transparent plate 33, a flat plate may be used; however, there will be a gap between the bare optical fibers 10, 10a and the transparent plate 33 in this case and therefore, a light beam emitted from either one of the bare optical fibers will be extended in the diameter thereof by the time it reaches the other bare optical fiber, thereby lowering the coupling efficiency. In order to improve the coupling efficiency, the transparent plate 33 should be formed as a convex lens so that the diameter of a light beam will not be enlarged. If a transparent plate 33 of a flat plate type should be used, it is desirable to use a condenser lens of flat type which is expressed by the formula in respect of the distance from the central axis of the part through which the light beam passes. $n(r)=n_0(1-ar^2)$ [wherein $n_0$ denotes a refractive index, a a coefficient.] In the present embodiment even if water infiltrates to the interface between the plug 8 and the transparent plate 33, it will not enter the inside of the submerged housing 5 because the plug 29 and the transparent plate 33 are sealed with the water-tight adhesive agent.

The application of the connector according to the present invention is not limited to underwater machines but may be extended to other submerged apparatus and installations and the type of water is not limited to marine water.

We claim:

1. A water-tight optical fiber connector comprising: a receptacle inserted in a water-tight container to be fixed integrally therewith; an annular, first sealing member for sealing said water-tight container and interposed between said receptacle and said water-tight container; an internal plug fixedly engaged with said receptacle in a manner to allow free attachment/detachment from inside said water-tight container and connected to ends of optical fiber cables in the water-tight container so as to have the center line of the optical fibers penetrate at the center thereof; an outer plug engaged with said receptacle in a manner to allow free attachment/detachment from outside said water-tight container to oppose said internal plug and connected to ends of optical fiber cables outside said water-tight container so as to have the center line of the optical fibers penetrate at the center thereof; pressing means screwed from outside said water-tight container into said receptacle for pushing said outer plug into said receptacle for fixation so as to make the opposing end surfaces of said internal plug and said outer plug abut each other; and a second sealing member interposed between said receptacle and said outer plug and communicating with the inside of said water-tight container for sealing the gap therebetween.

2. A water-tight optical fiber connector as claimed in claim 1, wherein said receptacle is screwed into the water-tight container for fixing said receptacle therewith.

3. A water-tight optical fiber connector as claimed in claim 1, wherein said second sealing member is an annular resilient ring.

4. A water-tight optical fiber connector as claimed in claim 1 or 3, comprising flexible sealing material covering an interface between said outer plug and ends of the optical fiber cables connected therewith.

5. A water-tight optical fiber connector as claimed in claim 1, wherein said second sealing member is a liquid inside a sealed container which is mounted with the receptacle outside said water-tight container and which surrounds said pressing means and the optical fiber cables.

6. A water-tight optical fiber connector as claimed in claim 1, comprising a tube connecting member mounted between said outer plug and said pressing means integrally with said outer plug, said connecting member having a rear end, protruding from a rear end of said outer plug and connected to optical fiber cables by a flexible third sealing member, a portion of said optical fiber cables being arranged so as to sag between said third sealing member and said rear end of said outer plug.

* * * * *